United States Patent
Adler et al.

(10) Patent No.: US 12,190,706 B2
(45) Date of Patent: *Jan. 7, 2025

(54) CREATION OF REMINDERS USING ACTIVITY STATE OF AN APPLICATION

(71) Applicant: Apple Inc., Cupertino, CA (US)

(72) Inventors: Scott Adler, Saratoga, CA (US); Viktor Miladinov, Palo Alto, CA (US); Garett R. Nell, Seattle, WA (US); José Angel Castillo Sánchez, Morgan Hill, CA (US); Christopher Linn, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,167

(22) Filed: Jun. 16, 2023

(65) Prior Publication Data

US 2023/0334974 A1 Oct. 19, 2023

Related U.S. Application Data

(63) Continuation of application No. 17/833,700, filed on Jun. 6, 2022, now Pat. No. 11,721,196, which is a
(Continued)

(51) Int. Cl.
*G08B 21/24* (2006.01)
*G06F 3/0481* (2022.01)
(Continued)

(52) U.S. Cl.
CPC ............ *G08B 21/24* (2013.01); *G06F 3/0481* (2013.01); *G06F 3/0484* (2013.01); *G06F 3/167* (2013.01);
(Continued)

(58) Field of Classification Search
CPC ....... G08B 21/24; G06F 40/166; G06F 16/86; G06F 16/90335; G06F 3/0484;
(Continued)

(56) References Cited

U.S. PATENT DOCUMENTS 5,541,981 A 7/1996 Lynn
6,265,974 B1 7/2001 D'Angelo et al.
(Continued)

FOREIGN PATENT DOCUMENTS

EP 2469303 6/2012
EP 2665023 11/2013
(Continued)

OTHER PUBLICATIONS

US 9,474,045 B1, 10/2016, Jackson et al. (withdrawn)
(Continued)

*Primary Examiner* — Daniel W Parcher
(74) *Attorney, Agent, or Firm* — Kilpatrick Townsend & Stockton LLP

(57) ABSTRACT

Systems, methods, and apparatuses are provided for creating and providing reminders that involve an activity states of an application on a device. An activity state can correspond to a particular view within an application, e.g., a view that was reached after several inputs from a user. A user can provide a specification of an activity state in a variety of ways, e.g., providing a reminder command while the application is executing in the foreground with the desired activity state or by voice commands that specify the activity state. A user can provide one or more trigger criteria. Once the reminder is triggered, the specified activity state can be provided to the user.

20 Claims, 8 Drawing Sheets

Related U.S. Application Data continuation of application No. 16/657,108, filed on Oct. 18, 2019, now Pat. No. 11,386,769, which is a continuation of application No. 14/871,115, filed on Sep. 30, 2015, now Pat. No. 10,453,325.

(60) Provisional application No. 62/169,351, filed on Jun. 1, 2015.

(51) Int. Cl.
*G06F 3/0484* (2022.01)
*G06F 3/16* (2006.01)
*G06F 16/84* (2019.01)
*G06F 16/903* (2019.01)
*G06F 40/166* (2020.01)
*G06Q 10/109* (2023.01)
*H04W 68/00* (2009.01)

(52) U.S. Cl.
CPC ........ *G06F 16/86* (2019.01); *G06F 16/90335* (2019.01); *G06F 40/166* (2020.01); *G06Q 10/109* (2013.01); *H04W 68/005* (2013.01); *H04Q 2209/823* (2013.01)

(58) Field of Classification Search
CPC ..... G06F 3/167; G06F 3/0481; G06Q 10/109; H04W 68/005; H04Q 2209/823
See application file for complete search history.

(56) References Cited

U.S. PATENT DOCUMENTS

| | | |
|---|---|---|
| 7,424,545 B2 | 9/2008 | Ducheneaut et al. |
| 7,889,101 B2 | 2/2011 | Yokota |
| 8,050,665 B1 | 11/2011 | Orbach |
| 8,054,180 B1 | 11/2011 | Scofield et al. |
| 8,245,252 B2 | 8/2012 | Gee et al. |
| 8,341,241 B2 | 12/2012 | Meuninck et al. |
| 8,375,320 B2 | 2/2013 | Kotler et al. |
| 8,385,944 B1 | 2/2013 | Nelissen |
| 8,416,073 B1 | 4/2013 | Scofield et al. |
| 8,629,767 B2 | 1/2014 | Stefanovski et al. |
| 8,686,852 B2 | 4/2014 | Ben-Dayan et al. |
| 8,838,138 B2 | 9/2014 | Modali et al. |
| 8,941,478 B2 | 1/2015 | Mirle et al. |
| 9,122,542 B1 | 9/2015 | Nelissen |
| 9,215,559 B2 | 12/2015 | Dave et al. |
| 9,247,387 B2 | 1/2016 | Bonanni et al. |
| 9,262,605 B2 | 2/2016 | Kim et al. |
| 9,319,843 B2 | 4/2016 | Lerenc |
| 9,327,645 B2 | 5/2016 | Raman et al. |
| 9,489,247 B2 | 11/2016 | Evans |
| 9,506,773 B1 | 11/2016 | Cherubini et al. |
| 9,552,717 B1 | 1/2017 | Rudolph |
| 9,554,050 B2 | 1/2017 | Dave et al. |
| 9,603,123 B1 | 3/2017 | Jackson et al. |
| 9,621,661 B2 | 4/2017 | Diem |
| 9,961,618 B2 | 5/2018 | Abraham et al. |
| 10,051,109 B2 | 8/2018 | Jackson et al. |
| 10,182,305 B2 | 1/2019 | Gillen |
| 10,235,863 B2 | 3/2019 | Adler et al. |
| 10,453,325 B2 | 10/2019 | Adler et al. |
| 10,475,327 B2 | 11/2019 | Adler et al. |
| 10,491,741 B2 | 11/2019 | Jackson et al. |
| 10,609,207 B2 | 3/2020 | Jackson et al. |
| 11,386,769 B2 | 7/2022 | Adler et al. |
| 2001/0028304 A1 | 10/2001 | I'Anson et al. |
| 2001/0029194 A1 | 10/2001 | Ketola et al. |
| 2002/0086680 A1 | 7/2002 | Hunzinger |
| 2005/0102607 A1 | 5/2005 | Rousselle et al. |
| 2005/0190080 A1 | 9/2005 | Flick |
| 2006/0077055 A1 | 4/2006 | Basir |
| 2006/0139375 A1* | 6/2006 | Rasmussen ........... G06F 3/0481 707/E17.11 |
| 2006/0156209 A1 | 7/2006 | Matsuura et al. |
| 2006/0195518 A1 | 8/2006 | Neilsen |
| 2006/0218029 A1 | 9/2006 | Chin |
| 2006/0273930 A1 | 12/2006 | Godden |
| 2007/0115837 A1 | 5/2007 | Elie-Dit-Cosaque et al. |
| 2007/0132836 A1 | 6/2007 | Katz |
| 2007/0241885 A1 | 10/2007 | Clipsham |
| 2007/0283279 A1 | 12/2007 | Barnes |
| 2008/0046965 A1 | 2/2008 | Wright et al. |
| 2008/0079566 A1 | 4/2008 | Singh et al. |
| 2008/0140795 A1 | 6/2008 | He et al. |
| 2008/0150959 A1 | 6/2008 | Marui |
| 2008/0287119 A1 | 11/2008 | Yasuda |
| 2009/0077159 A1 | 3/2009 | Murakami |
| 2009/0212936 A1 | 8/2009 | Granatelli et al. |
| 2009/0249222 A1 | 10/2009 | Schmidt et al. |
| 2009/0287418 A1 | 11/2009 | Trepagnier et al. |
| 2010/0017855 A1* | 1/2010 | Johnson .............. G06F 16/9574 726/4 |
| 2010/0026526 A1 | 2/2010 | Yokota |
| 2010/0161720 A1 | 6/2010 | Colligan et al. |
| 2010/0190513 A1 | 7/2010 | Andreasson |
| 2010/0295676 A1 | 11/2010 | Khachaturov et al. |
| 2010/0298656 A1 | 11/2010 | McCombie et al. |
| 2011/0004885 A1 | 1/2011 | Kikuchi et al. |
| 2011/0084807 A1 | 4/2011 | Logan et al. |
| 2011/0185029 A1 | 7/2011 | Jain et al. |
| 2011/0314124 A1 | 12/2011 | Gimson |
| 2011/0314404 A1 | 12/2011 | Kotler et al. |
| 2012/0001843 A1 | 1/2012 | Gravino |
| 2012/0029964 A1 | 2/2012 | Tengler et al. |
| 2012/0069388 A1 | 3/2012 | Nakatani et al. |
| 2012/0077463 A1 | 3/2012 | Robbins et al. |
| 2012/0155263 A1 | 6/2012 | Long |
| 2012/0197523 A1 | 8/2012 | Kirsch |
| 2012/0222009 A1 | 8/2012 | Ayewah et al. |
| 2012/0242482 A1 | 9/2012 | Elumalai et al. |
| 2012/0244814 A1 | 9/2012 | Okayasu |
| 2012/0265535 A1 | 10/2012 | Bryant-Rich et al. |
| 2012/0299717 A1 | 11/2012 | Yoshino et al. |
| 2012/0302258 A1 | 11/2012 | Pai et al. |
| 2012/0316456 A1 | 12/2012 | Rahman et al. |
| 2013/0138622 A1 | 5/2013 | Ayers et al. |
| 2013/0212197 A1 | 8/2013 | Karlson |
| 2013/0244633 A1 | 9/2013 | Jacobs et al. |
| 2013/0245986 A1 | 9/2013 | Grokop et al. |
| 2013/0257604 A1 | 10/2013 | Mirle et al. |
| 2013/0260784 A1 | 10/2013 | Lutz |
| 2013/0307681 A1 | 11/2013 | Borg et al. |
| 2013/0316720 A1 | 11/2013 | Dwyer et al. |
| 2013/0324093 A1 | 12/2013 | Santamaria et al. |
| 2013/0324160 A1 | 12/2013 | Sabatellil et al. |
| 2013/0336258 A1 | 12/2013 | Young et al. |
| 2014/0009285 A1 | 1/2014 | Khachaturov et al. |
| 2014/0012117 A1 | 1/2014 | Mensinger et al. |
| 2014/0033071 A1 | 1/2014 | Gruber et al. |
| 2014/0099921 A1 | 4/2014 | Weiss |
| 2014/0118272 A1 | 5/2014 | Gunn |
| 2014/0155097 A1 | 6/2014 | Tucker |
| 2014/0207570 A1 | 7/2014 | Cancro et al. |
| 2014/0248910 A1 | 9/2014 | Dave et al. |
| 2014/0253314 A1 | 9/2014 | Rambadt et al. |
| 2014/0253320 A1 | 9/2014 | Bender |
| 2014/0266810 A1 | 9/2014 | Hatton |
| 2014/0269363 A1 | 9/2014 | Lee et al. |
| 2014/0274203 A1 | 9/2014 | Ganong, III et al. |
| 2014/0280439 A1 | 9/2014 | Hatton |
| 2014/0280580 A1 | 9/2014 | Langlois et al. |
| 2014/0282606 A1 | 9/2014 | Clark et al. |
| 2014/0282721 A1 | 9/2014 | Kuncl et al. |
| 2014/0283074 A1 | 9/2014 | Sohn et al. |
| 2014/0304363 A1 | 10/2014 | Mhatre et al. |
| 2014/0342718 A1 | 11/2014 | Chen et al. |
| 2014/0344446 A1 | 11/2014 | Rjeili et al. |
| 2014/0351832 A1 | 11/2014 | Cho et al. |
| 2015/0005978 A1 | 1/2015 | Nakakita et al. |
| 2015/0015409 A1 | 1/2015 | Won |
| 2015/0061896 A1 | 3/2015 | Walther et al. |
| 2015/0074615 A1 | 3/2015 | Han et al. |

(56) References Cited

U.S. PATENT DOCUMENTS

| | | |
|---|---|---|
| 2015/0080031 A1 | 3/2015 | Moldavsky et al. |
| 2015/0092928 A1 | 4/2015 | Jensen et al. |
| 2015/0105106 A1 | 4/2015 | Masterman |
| 2015/0137996 A1 | 5/2015 | Terashima |
| 2015/0143281 A1 | 5/2015 | Mehta et al. |
| 2015/0164437 A1 | 6/2015 | McCombie et al. |
| 2015/0181511 A1 | 6/2015 | Abraham et al. |
| 2015/0237475 A1 | 8/2015 | Henson et al. |
| 2015/0319579 A1 | 11/2015 | Syrjarinne et al. |
| 2015/0350413 A1 | 12/2015 | Ma et al. |
| 2015/0358766 A1 | 12/2015 | McDevitt et al. |
| 2015/0370884 A1 | 12/2015 | Hurley et al. |
| 2016/0035213 A1 | 2/2016 | Choi |
| 2016/0037482 A1 | 2/2016 | Higgins et al. |
| 2016/0062570 A1 | 3/2016 | Dascola et al. |
| 2016/0077674 A1 | 3/2016 | Forster et al. |
| 2016/0086141 A1 | 3/2016 | Jayanthi et al. |
| 2016/0117928 A1 | 4/2016 | Hodges et al. |
| 2016/0156773 A1 | 6/2016 | Chanda |
| 2016/0162148 A1 | 6/2016 | Murphy et al. |
| 2016/0165381 A1 | 6/2016 | Kapoor et al. |
| 2016/0187452 A1 | 6/2016 | Schillings |
| 2016/0203018 A1 | 7/2016 | DeLuca et al. |
| 2016/0203497 A1 | 7/2016 | Tietzen et al. |
| 2016/0209973 A1 | 7/2016 | Kaufthal et al. |
| 2016/0241542 A1 | 8/2016 | Kim et al. |
| 2016/0284199 A1 | 9/2016 | Dotan-Cohen et al. |
| 2016/0309310 A1 | 10/2016 | Herman et al. |
| 2016/0342694 A1 | 11/2016 | Allen et al. |
| 2016/0343233 A1 | 11/2016 | Wassef et al. |
| 2016/0349953 A1 | 12/2016 | Adler et al. |
| 2016/0350306 A1 | 12/2016 | Hurley et al. |
| 2016/0358451 A1 | 12/2016 | Adler et al. |
| 2017/0013464 A1 | 1/2017 | Fish et al. |
| 2017/0041025 A1 | 2/2017 | Murakami et al. |
| 2017/0048376 A1 | 2/2017 | Logan |
| 2017/0053287 A1 | 2/2017 | Kannan et al. |
| 2017/0162016 A1 | 6/2017 | Olson |
| 2017/0238138 A1 | 8/2017 | Aminzade |
| 2017/0251097 A1 | 8/2017 | Jackson et al. |
| 2017/0263101 A1 | 9/2017 | Funakoshi et al. |
| 2018/0260081 A1 | 9/2018 | Beaudoin et al. |
| 2019/0114326 A1 | 4/2019 | Agrawal |

FOREIGN PATENT DOCUMENTS

| | | |
|---|---|---|
| WO | 2012022021 | 2/2012 |
| WO | 2014209374 | 12/2014 |
| WO | 2016196092 | 12/2016 |
| WO | 2016197060 | 12/2016 |

OTHER PUBLICATIONS

US 10,362,162 B2, 07/2019, Jackson et al. (withdrawn)

"Launch Files & Applications on a Scheduled Date with Calendar for Mac OS X", OSX Daily, Available Online at: http://osxdaily.com/2013/04/15/1aunchfile-app-scheduled-date-mac-os-x, Apr. 15, 2013, 5 pages.

"Siri vs. Cortana—Happy Anniversary (Commercial)", Nokia Iran, Available Online at: https://www.youtube.com/watchv=8e8rZxRpMlo, Jul. 28, 2014, 1 page.

"Trigger", EgoMotion, Product Data Sheet, Available Online at: <https:iNJWW.googie.comigws_rd::ssl#q::Trigger+EgoMotion, 2015, 5 pages.

U.S. Appl. No. 14/871,115 , "Advisory Action", Aug. 10, 2018, 7 pages.

U.S. Appl. No. 14/871,115 , "Corrected Notice of Allowability", Aug. 21, 2019, 2 pages.

U.S. Appl. No. 14/871,115 , "Corrected Notice of Allowability", Sep. 5, 2019, 2 pages.

U.S. Appl. No. 14/871,115 , "Final Office Action", Apr. 19, 2018, 26 pages.

US Patent Application No. 14/871, 115 , "First Action Interview Office Action Summary - 2 Mo", Dec. 14, 2017, 5 pages.

U.S. Appl. No. 14/871,115 , "First Action Interview Pilot Program Pre-Interview Communication", Oct. 6, 2017, 4 pages.

U.S. Appl. No. 14/871,115 , "Non-Final Office Action", Jan. 23, 2019, 31 pages.

U.S. Appl. No. 14/871,115 , "Notice of Allowance", Jun. 14, 2019, 18 pages.

U.S. Appl. No. 16/657,108 , "Advisory Action", May 3, 2021, 6 pages.

U.S. Appl. No. 16/657,108 , "Final Office Action", Feb. 10, 2021, 21 pages.

U.S. Appl. No. 16/657,108 , "Final Office Action", Oct. 13, 2021, 25 pages.

U.S. Appl. No. 16/657,108 , "First Action Interview Office Action Summary", Nov. 24, 2020, 4 pages.

U.S. Appl. No. 16/657,108 , "First Action Interview Pilot Program Pre-Interview Communication", Oct. 15, 2020, 4 pages.

U.S. Appl. No. 16/657,108 , "Non-Final Office Action", Jun. 24, 2021, 22 pages.

U.S. Appl. No. 16/657,108 , "Notice of Allowance", Mar. 9, 2022, 14 pages.

U.S. Appl. No. 17/833,700 , "Notice of Allowance", Mar. 16, 2023, 12 pages.

Hoffman , "How to Automatically Run Programs and Set Reminders With the Windows Task Scheduler", Available Online at: http://www.howtogeek.com/123393/how-to-automatically-run-programs-and-set-reminders-with-the-windows-task-scheduler, Accessed from Internet on Jun. 11, 2019, 13 pages.

Matthews , "Link into a Single Paragraph Within a Google Doc", Stemlegal.com, Available Online at: https://www.stemlegal.com/strategyblog/2013/link-into-a-single-paragraph-within-a-google-doc/, May 31, 2013, pp. 1-4.

International Patent Application No. PCT/US2016/033972 , "International Search Report and Written Opinion", Aug. 2, 2016, 13 pages.

International Patent Application No. PCT/US2016/035911 , "International Search Report and Written Opinion", Jul. 27, 2016, 11 pages.

Ugale et al., "A Location-Based Personal Task Reminder for Mobile Users in Wireless College Campus Environment (Indoor and Outdoor)", International Journal of Computer Techniques, vol. 2, No. 1, Jan. 1, 2015, pp. 1-7.

\* cited by examiner

CREATION OF REMINDERS USING ACTIVITY STATE OF AN APPLICATION

CROSS REFERENCE OF RELATED APPLICATIONS

The present application is a continuation of U.S. patent application Ser. No. 17/833,700 filed Jun. 6, 2022, which is a continuation of U.S. patent application Ser. No. 16/657,108 filed Oct. 18, 2019, now U.S. Pat. No. 11,386,769, which is a continuation of U.S. patent application Ser. No. 14/871,115 filed Sep. 30, 2015, now U.S. Pat. No. 10,453,325, which claims the benefit of and priority to U.S. Provisional Application No. 62/169,351, filed Jun. 1, 2015, the entire contents of which are incorporated herein by reference for all purposes.

BACKGROUND

A user can set a reminder on a device by opening a specific reminder application, e.g., a calendar application, and typing text. Such a reminder will provide a notification with the user-provided text when a specified time is reached. Such reminders are certainly useful, but are limited to the reminder application providing the user's text at a certain time.

Users can also set reminders on mobile devices to provide a notification when the mobile device is close to a particular destination. For example, a user can set a reminder to pick up an item when the user is close to a particular store. In a reminder application on the mobile device, the user can write a note that reminds the user of needing the item, where the note is provided to the user as the notification. However, notes have limited functionality and use.

BRIEF SUMMARY

Embodiments are directed to systems, methods, and apparatuses for creating and providing a reminder that involves an activity state of an application on a device. An activity state can correspond to a particular view within an application, e.g., a display window that was reached after several inputs from a user. A user can provide a specification of an activity state in a variety of ways, e.g., providing a reminder command while the application is executing in the foreground with the desired activity state. As another example, a user can provide voice commands that specify the activity state. A user can further provide one or more trigger criteria. Once the reminder is triggered, the specified activity state can be provided to the user.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Figure 1:
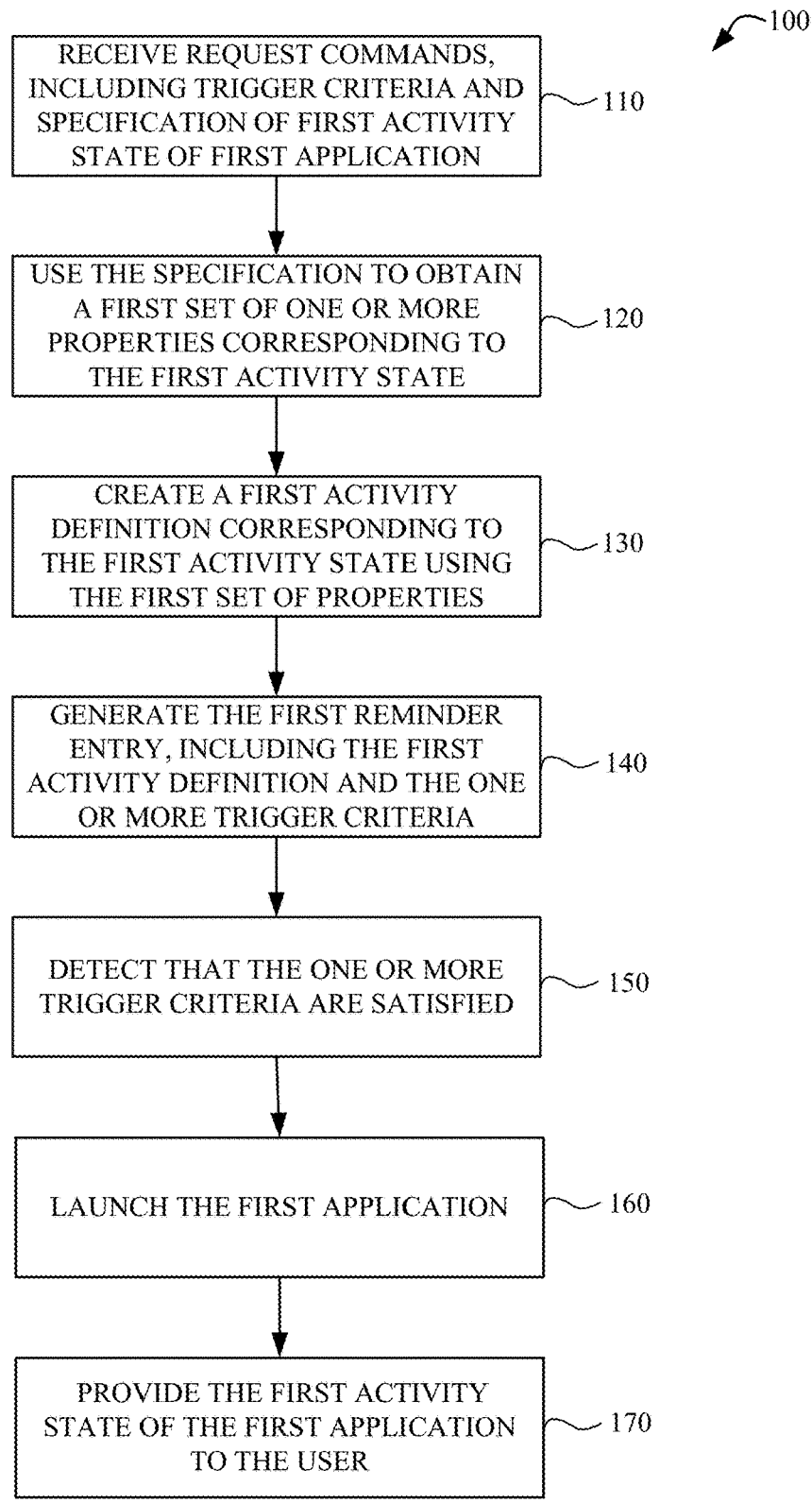
FIG. 1 is a flowchart illustrating a method for providing a reminder to a user of a computing device according to embodiments of the present invention.

Embodiments are directed to systems, methods, and apparatuses for creating and providing a reminder that involves an activity state of an application on a device. The use of an activity state can allow a triggering of a reminder to launch an application with a particular view, such as having a particular document opened, potentially even to a particular part of the document.

Some embodiments can allow a user to establish a reminder from an application that the user is currently using in the foreground. For example, a user could establish a reminder that provides a particular document, website, or functionality to a user when the reminder is triggered. Triggers for the reminders can include, for example, a geographical location, time, and other criteria. Such reminders can be generated when a user is at the particular part of an application (e.g., viewing a particular document, at a listing in an application that provides reviews, or at a particular website). For example, a share object (or a more specific reminder object) may be displayed on a screen for the current activity state, and the object may be activated to start a process for creating the reminder using the current activity state. In other examples, a user can specific an activity state of an application using voice commands, and the specified activity state need not be currently active at the time of creating the reminder.

An activity state may be defined to bring up a particular view within a particular application. This may be done by defining the activity state using one or more properties, e.g., that are identifiable by the application. In this manner, the application can parse the activity definition to determine the desired activity state. Such an activity state definition can encapsulate the state of a user activity in an application in a way that allows the same activity to be recalled when a reminder is triggered. Activity states can include actions such as editing a document, viewing a web page, or watching a video.

I. Reminders with Activity States

An activity state of an application can be used to make a reminder that is more convenient. In this manner, the reminder not only reminds the user of a task (which could be done with just text identifying an application), but can also launch the application in the specific state that the user needs to perform the task. Thus, the user does not need to open the application, navigate to particular functionality (e.g., to a particular e-mail, document, or response state). The device can automatically open the application at the desired screen (example of an activity state), and the user can complete the task more efficiently.

A. Reminders

A reminder can allow a user to specify an action to be performed on a computing device (e.g., a phone, tablet, laptop computer, or desktop computer) when one or more trigger criteria are satisfied. Examples of trigger criteria can include a specified time, a specified geographical location, and a particular operation on a computing device. When a trigger criterion includes a geographical location, the trigger criterion can be satisfied when the computing device is within a specified distance of the geographical location.

An example of an action can be providing a particular notification to a user. Typically, a user would open a reminder application and type a subject and then any notes of the reminder, either of which could be provided in the notification. The notification can serve to remind the user of a task that needed to be done. The notification can be provided to the user at a specified time according to the one or more trigger criteria, which may be at a time that is convenient for the user to perform the task. But, such notes are limited.

An action can be to launch an application. For example, a music application can automatically launch when a device connects with a car. Applications can also be launched at specific times, e.g., as background processes to be performed on a computer. Or, such background processes could be run in response to other triggers, e.g., in response to a connection or specific communication with another device. But, such launches of applications are not reminders and do not serve a reminder function.

A reminder application can display a list of reminders at a particular screen within the reminder application. Each reminder in the list can be referred to as a reminder entry. The reminder application can store these reminder entries and monitor the trigger criteria to determine when to perform any action associated with the reminder. The list can show the subject of the reminders, and selecting a reminder can provide any notes, which may be provided to the user when the reminder is triggered. In embodiments of the present invention, a reminder entry can include an activity state of an application, such that the action is to launch an application in the particular activity state as a reminder, e.g., for the user to perform a particular task.

B. Activity States

An activity state can correspond to a particular view that is currently or can be presented to a user. For example, the state can correspond to a particular navigation screen that a user has reached after selecting one or more options with the application. A mail application can have a reply e-mail open for replying to a particular e-mail, and such would be a particular activity state of the mail application. Such an activity state can be defined by one or more properties, e.g., the identification of the e-mail to reply and a reply action. Thus, the one or more properties can specify an item and an action to be performed on the item. Further properties can specify a particular location in an item, e.g., a particular location within a file.

Other properties can include the identification of one or more windows that are open for an application, e.g., on computing devices that can show more than one window at a time. As other examples, the properties can be a sequence of buttons (or other user interface elements) that a user has selected to reach a particular activity state.

The properties can provide an activity definition, where the activity definition is operable to allow the application to provide the activity state to a user. The activity definition may include further information that an application may require for another process to invoke the application. For example, the activity definition may include specific application protocol interface (API) commands. An API command could be specific to a particular application, where the one or more properties are used to generate the API command.

C. Method

FIG. 1 is a flowchart illustrating a method 100 for providing a reminder to a user of a computing device according to embodiments of the present invention. Method 100 can be performed by a computing device, such as a phone, tablet, laptop computer, or a desktop computer. In various embodiments, method 100 can be performed using voice commands, a touchscreen, keyboard, or a pointing device.

At block 110, request commands can be received from the user to create a first reminder entry. The request commands can be provided in a variety of ways, and different request commands can be provided in different ways. For example, one request command can be provided via a touchscreen, and another request command can be provided as a voice command.

The request commands can include a reminder command for invoking a reminder application to execute on the computing device. The reminder application can be any routine(s) that can be used to create a reminder. The request commands can further include one or more trigger criteria for providing the reminder to the user. As mentioned above, examples of trigger criteria are a particulate date/time and a particular location.

The request commands can also provide a specification of a first activity state of a first application to execute on the computing device as part of the reminder. The specification can be provided in a variety of ways. For example, providing the reminder command while the first application is in the first activity state can function to provide the specification. As another example, a user can provide one or more voice commands that, e.g., include one or more properties of the first activity state, include tag information (e.g., activity tags) for accessing a mapping index that maps the tag information to one or more properties of the first activity state, or can be used to activate UI elements such that the first application enters the first activity state, from which the one or more properties can be obtained. The reminder command, a trigger criterion, and the specification of the first activity state can each be provided as a separate request command.

At block 120, the specification can be used to obtain a first set of one or more properties corresponding to the first activity state. Example of properties include: a name of a current screen in the application, a node of the screen in a hierarchy, any terms input by a user, a list of objects selected by the user to reach the current state, and the like. The first set of properties may be obtained from a variety of places. As mentioned above, the first set of properties may be obtained from the user in the request commands. The first set of properties can be obtained by querying the first application, e.g., when the first application is currently providing the first activity state. The first set of properties can be obtained by using the specification from the user to query a mapping index, e.g., that maps voice commands to the one or more properties of an activity state.

At block 130, a first activity definition corresponding to the first activity state is created using the first set of properties. The first activity definition can be operable to allow the first application to provide the first activity state to a user. The first activity definition can used by the reminder application or a system routine to invoke the first application to launch in the first activity state.

In some embodiments, the first activity definition can include a URL, e.g., corresponding to a particular page of a website, potentially including any user provided information as arguments. Thus, the first application may be a network browsing application. The request commands can be provided while the user is using a second application, which may correspond to the website. The second application can provide the URL in response to a request of a current state from the reminder application. The providing of the URL may be done, if the second application does not allow the functionality of being invoked directly, or potentially the URL may be provided in addition (e.g., in case the reminder is launched on a different device that does not include the second application). Then, the URL can be used to launch the network browsing application when the reminder is triggered.

At block 140, the first reminder entry is generated. The first reminder entry can include the first activity definition and the one or more trigger criteria. The reminder application can monitor sensors (e.g., a location sensor or a clock) to determine when the one or more trigger criteria are satisfied. For example, the reminder application can check whether any reminder entries are triggered for a given time.

The first reminder entry can be provided in a list of reminders, which may be accessed in the reminder application. When a user accesses the first reminder entry, the first activity definition can be provided to the user, e.g., as a link such that the first activity state can be provided to the user at that time. The text of the link may be a shorted form of the activity definition, e.g., a form that can be readable by a person.

At block 150, the computing device can detecting that the one or more trigger criteria are satisfied. The detection can involve various routines and components of the computing device. For example, the computing device can monitor one or more sensors of the computing device. Such sensors can include a clock, a location sensor (e.g., GPS), and motion sensors, such as an accelerometer, a gyrometer, a compass or other sensors.

At block 160, the first application can be launched responsive to the detection that the one or more trigger criteria are satisfied. The first application can be launched immediately after detecting the one or more trigger criteria are satisfied, or launched at a later time. For example, a user can be provide an option to launch, e.g., by selecting an OK or confirm UI element. Thus, a user can be provided with a notification of whether the user wishes to proceed with launching the first activity state. The first application can be launched further responsive to an affirmative user response. Such launching is still responsive to the detection, but not necessarily immediate.

At block 170, the first activity definition in the first reminder entry is used to provide the first activity state of the first application to the user. For example, the first activity definition can be provided to a system routine (e.g., a launcher application) that launches the first application and provides all or some of the first activity definition to the first application. As another example, a system routine can provide parts of the first activity definition in a particular sequence, with each part causing the first application to move to a new state, with the final state corresponding to the first activity state.

A similar procedure can be repeated for a second application. For example, a second reminder entry can include a second activity definition corresponding to a second activity state of a second application. A second request can be received from the user, and the second reminder entry can be created via any of ways described herein.

D. System

Figure 2:
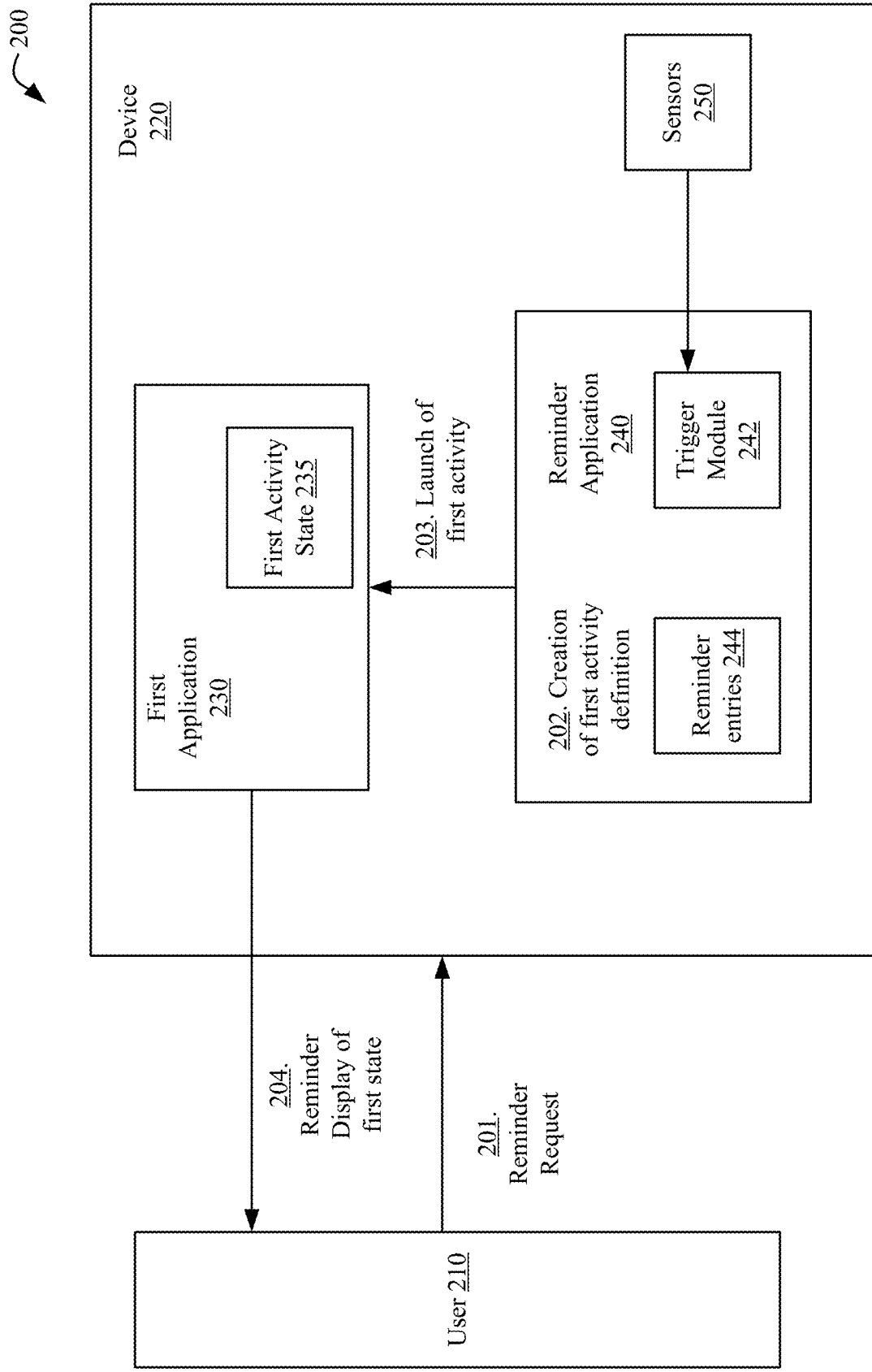
FIG. 2 shows a block diagram of a user interacting with a device to create a reminder and the providing of a desired activity state for the reminder according to embodiments of the present invention.

FIG. 2 shows a block diagram 200 of a user 210 interacting with a device 220 to create a reminder and the providing of a desired activity state for the reminder according to embodiments of the present invention. In FIG. 2, device 220 includes a first application 230 that has a first activity state 235. In some embodiments, first application 230 can provide first activity state 235 to user 210 in response to the user 210 interacting with first application 230. For example, a user might select a particular view of a map application or open a particular e-mail of a mail application, both examples of a first application. First application 230 would have many other activity states (not shown). First activity state 235 can be provided to user 210 before the creation of any reminder, e.g., to allow user 210 to specify first activity state 235 for the reminder.

Reminder application 240 can create reminders based on requests from user 210. After creation of a reminder, reminder application 240 can store the reminders as reminder entries 244. The reminder entry can include any text received from the user (e.g., a title of the reminder and any notes to be provided in a notification), one or more trigger criteria, and a specification of the first activity state. Reminder application 240 can include a trigger module 242 for determining when the one or more trigger criteria are satisfied. As an example, sensors 250 can provide information (e.g., time, location, etc.) to trigger module 242 to determine when the one or more trigger criteria are satisfied. Trigger module 242 can send a command to reminder application or a system routine (e.g., a launcher application) to launch first activity state 235 of first application 230 as part of providing the reminder to user 210.

At 201, user 210 sends a reminder request to device 220. The reminder request can include one or more request commands (e.g., as received in block 110 of FIG. 1). Reminder request can be sent at various times, e.g., when first activity state 235 is displayed to a user. As another example, reminder request 201 can be received as voice commands that specify first activity state 235.

At 202, reminder application 240 can create a first activity definition that corresponds to first activity state 235. The first activity definition can be stored in a first reminder entry in reminder entries 244 (e.g., in a table). The definition may be formed from one or more properties of first activity state 235. The one or more properties can be determined in various ways. For example, voice commands of reminder request 201 can include the one or more properties in a specification of the first activity state 235. Reminder application 240 could query first application 230 to obtain the one or more properties, e.g., when first activity state 235 is being displayed to user 210. Further, reminder application 240 could query a mapping index in device 220 or on another device (e.g., a server) using the specification received from the user. The index can store information to create definitions based on particular specifications. For example, the index can store a mapping between voice commands and a particular activity definition.

At 203, in response to the one or more trigger criteria being satisfied, reminder application 240 can send a launch command to first application 230 to launch first activity state 235. The launch command can be sent directly or indirectly to first application 230, e.g., reminder application 240 can provide the activity definition to a launching application that can launch first application 230. For example, trigger module 242 can determine that the one or more trigger criteria are satisfied. The first reminder entry can be retrieved, and the first activity definition can be used to send the launch command to first application 230.

At 204, first activity state 235 can be sent in a reminder display to user 210. Such a display can be a screen showing first activity state 235, potentially with a reminder note (e.g., "send reply e-mail" or "plan waking tour of San Francisco").

The activity definition can include URL that corresponds to first activity state 235. First application 230 can define a specific URL so that a corresponding part of a website can be accessed. In this manner, functionality can be obtained in situations where first application 230 does not have an API for launching a particular state. A URL can also be useful when the reminder is viewed on a different device, and the other device does not have first application 230 installed, but a provider of first application 230 maintains a website with similar functionality. The URL of the activity definition would correspond to the desired functionality of the website.

Some client applications can allow the reminder application to retrieve title information from a current activity state. Thus, if a client application opts in, the application can provide convenient titles and any other items that can show up in these reminders. Further, the application can use currently selected text to define an activity state, and such selected text can show up in a reminder (e.g., as a note), or be highlighted when the activity state launched as part of a reminder.

II. Creating Reminders From Within a Specific Application

A user can be in the middle of an activity when the user desires to create a reminder. For example, the user can be browsing a website or checking their e-mail, which prompts them to create a reminder. Therefore, exemplary embodiments allow a user to create a reminder according to the user activity.

A. Touch Screen Example

A reminder can be created by using a share function of the device. For example, if a user is browsing a webpage on their internet browser and would like to create a reminder based on the webpage, the user can select a share function of their internet browser to generate a reminder. Other examples include a user interacting with a map application or a messaging application. In some embodiments, a share object can be used to access a share menu that has an option of selecting to create a reminder using the current state of the application. Generation of a reminder using a share menu is described in more detail with respect to FIGS. 3A and 3B. In other embodiments, a reminder object with just reminder functionality can be used instead of a share function.

Figure 3B:
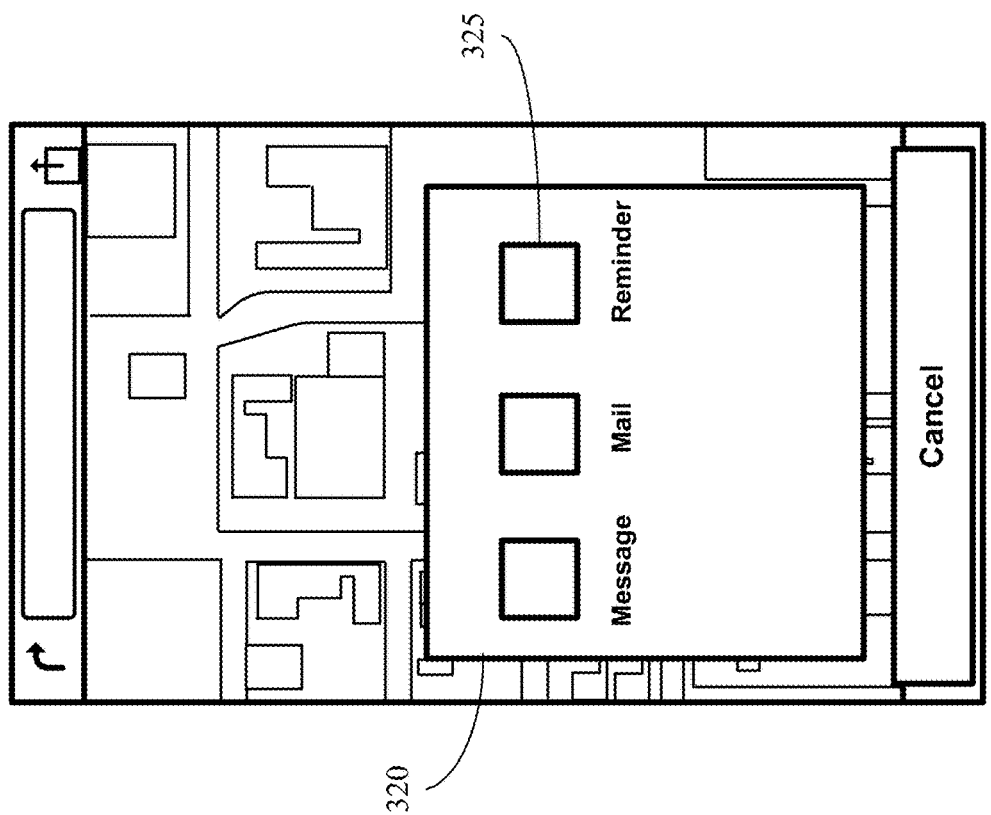
FIGS. 3A and 3B are diagrams illustrating generation of a reminder from a share object of a given display of an executing map application according to embodiments.
Figure 3A:
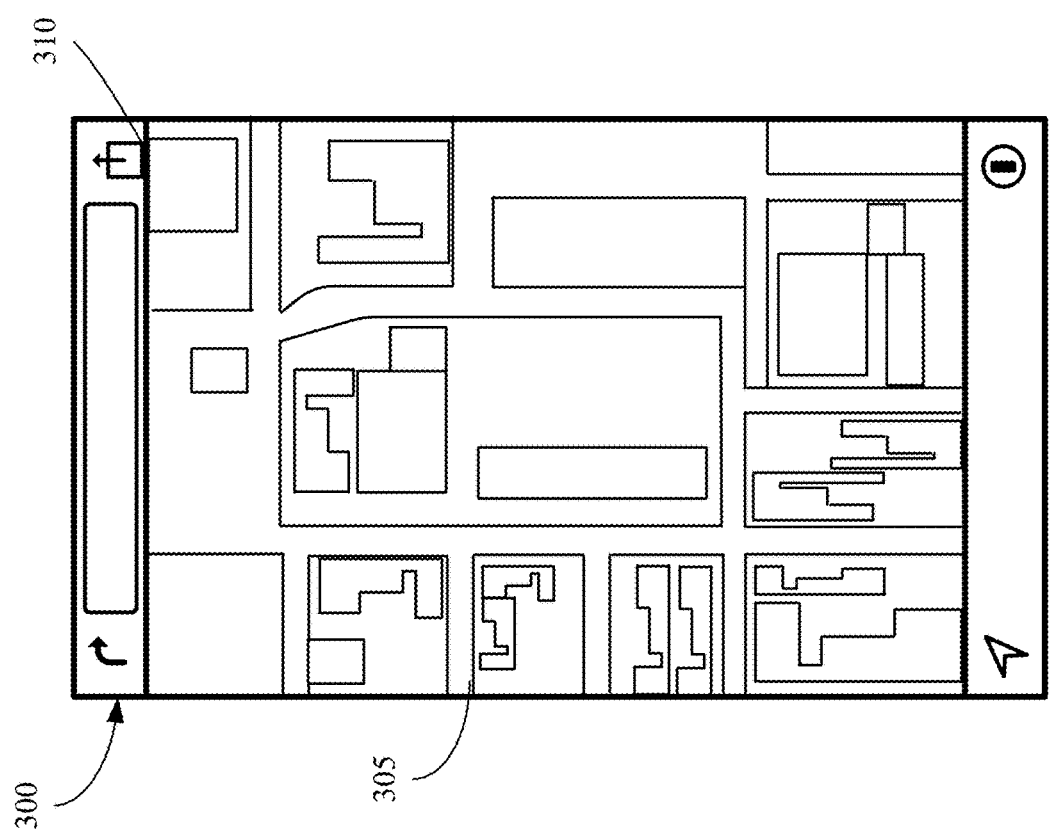

FIGS. 3A and 3B are diagrams illustrating generation of a reminder from a share object of a given display of an executing map application according to embodiments. FIG. 3A shows a display screen 300 of a user device. The device is currently displaying a map view 305 of a map application. When a user desires to create a reminder based on the location currently being viewed by the user, the user can select a share icon 310 (or other share object or a reminder object). Although share icon 310 may be used to provide multiple options for sharing an activity state, some embodiments may use a reminder object (a specific type of share object) on a screen provided with the current activity state, where the reminder object is used to only create a reminder. An icon is an example of a user interface element, of which other examples are buttons, tabs, and the like.

As shown in FIG. 3B, a share menu 320 appears after selecting share icon 310 and provides the user with an option to create a reminder. The user can create a reminder from share menu 320 by selecting a reminder icon 325. A reminder can then be generated that corresponds to the location being viewed by the user, potentially with any current settings in the views, e.g., any pins. Other options are available, e.g., to send a link of the map activity state to another person, e.g., via message or mail. Therefore, a reminder can be created while a user is viewing a screen of an application. Selecting reminder icon 325 can activate a reminder application for generating the reminder.

Once the reminder application is activated for the map application, a user can provide one or more trigger criteria, e.g., date/time or location. For example, a user might want to be reminded of a particular location of a new city that the user is going to visit, where the reminder can be provided when the user arrives in the city. A user can also provide text, such as notes and a title. Such information can be provided via any input device, e.g., a touchscreen or a pointing device (e.g., a mouse, along with a keyboard, or by voice commands).

As other example, a reminder can be created for an e-mail application. For instance, a user can review an e-mail, for example, on the user's laptop, when the used desires to create a reminder. A reminder can be generated using an activity state of the e-mail application that is currently being viewed by the user. Once the reminder entry is created, the user can view the reminder entry in a list, where the reminder entry can be displayed with an e-mail application icon to indicate to the user that the reminder is directed to an e-mail application. Such icons can be used for other applications. The reminder entry can include a link to the activity state definition, thereby allowing a user to activate that state at some time before the trigger occurs by selecting the link.

As another example, a reminder can be generated while browsing a webpage. A user can be browsing a website on their Internet browser when the user desires to create a reminder. A reminder can be generated according to the webpage being used by the user. For example, a reminder can be created to include a URL to the webpage that was being viewed by the user. Therefore, when the user views the reminder entry, a URL to the corresponding webpage can be shown in the reminder entry. Although an e-mail application and an Internet browser are described above, these are merely examples, and various types of activity states can be used to create a reminder. For example, various types of links can be used to direct the user to an application or website.

B. Method

Figure 4:
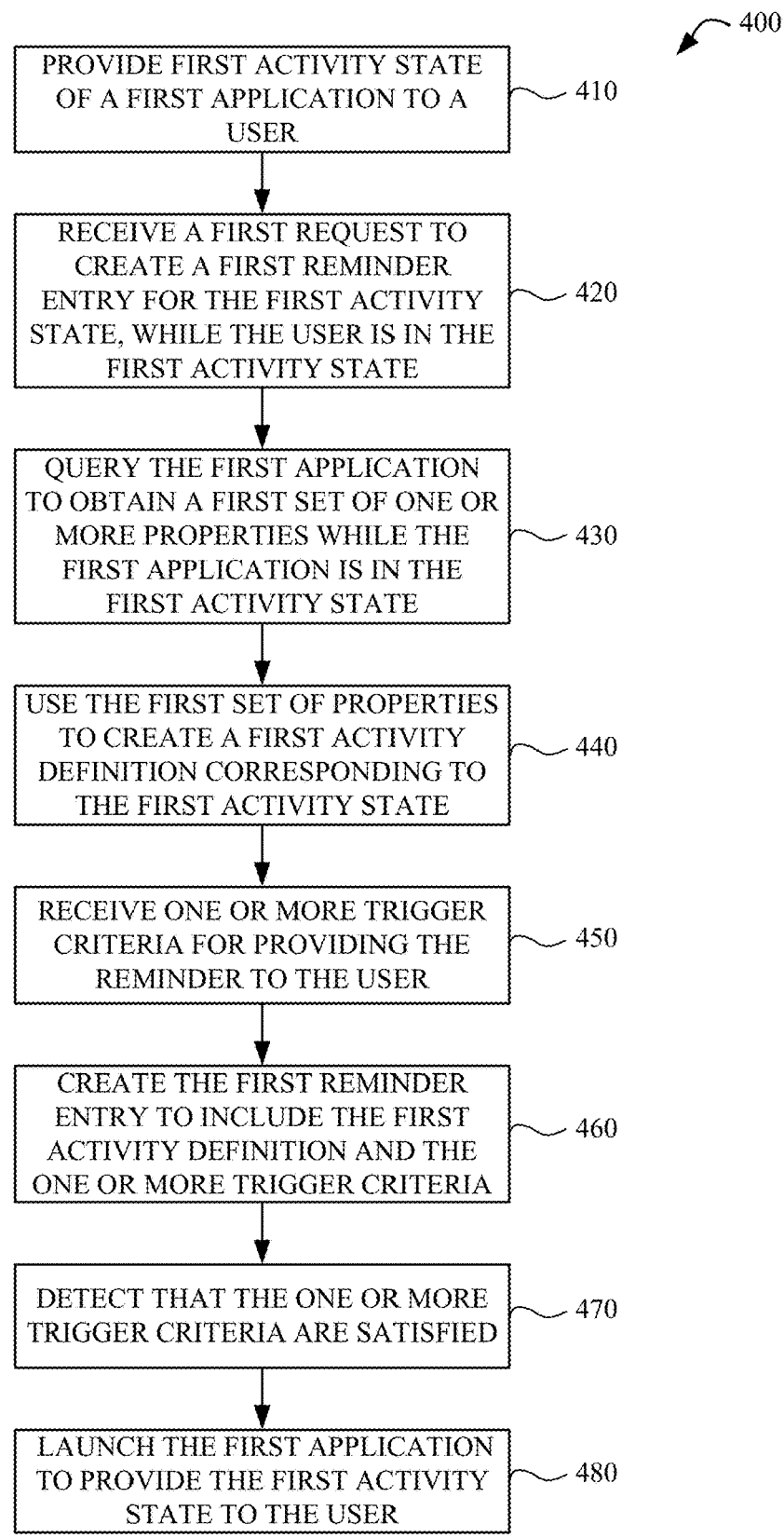
FIG. 4 is a flowchart illustrating a method for creating a reminder using a current activity state of an executing application according to embodiments of the present invention.

FIG. 4 is a flowchart illustrating a method 400 for creating a reminder using a current activity state of an executing application according to embodiments of the present invention. As with other methods described herein, method 400 can be performed by a computing device.

At block 410, a first activity state of a first application is provided to a user as part of the user using the first application on the computing device. The first activity state can correspond to any view that a user reaches after interacting with the first application. For example, a user might have selected various UI elements to reach a particular document or other type of file, information about a particular business (e.g., in a reviewer application), particular communications with a particular person in a messaging application, and so on.

At block 420, a first request to create a first reminder entry for the first activity state is received while the user is in the first activity state. For example, a share object on a display screen can be selected by a user. The first request can invoke a reminder application to execute on the computing device. The reminder application can be used to create a first reminder entry corresponding to the first activity state.

At block 430, a query can be sent to the first application to obtain a first set of properties while the first application is in the first activity state. The first application can receive the query and determine the current activity state, which may be tracked by the first application. The first application can check any settings or other values used to provide the particular view and determine whether the user has added any information to the activity state (e.g., any text).

In some embodiments, the first application can provide a title, other information, and one or more properties of the current activity state because the first application knows the current state provided to the user. If the first application does not support internal activity states, the first application can provide a URL instead, which can be used by a network browsing application to reach functionality on a website that corresponds to the first activity state. For example, an application can provide an entry ID for a particular business being viewed, where the entry ID is included in the URL according to a format that the corresponding website can understand.

At block 440, the first set of properties can be used to create a first activity definition corresponding to the first activity state. The first activity definition can be operable to allow the first application to provide the first activity state to a user. Block 440 can be implemented in a similar manner as block 130 of FIG. 1.

At block 450, one or more trigger criteria are received for providing the reminder to the user. A examples, the one or more trigger criteria can be received by a graphical user interface (GUI) or via voice commands. Examples of trigger criteria are described herein.

At block 460, the first reminder entry is created and can include the first activity definition and the one or more trigger criteria. Block 460 can be implemented in a similar manner as block 140 of FIG. 1.

At block 470, the computing device can detecting that the one or more trigger criteria are satisfied. Block 470 can be implemented in a similar manner as block 150 of FIG. 1.

At block 480, responsive to the detection, the first application can be launched to provide the first activity state to the user. Block 470 can be implemented in a similar manner as blocks 160 and 170 of FIG. 1. For example, the first activity definition in the first reminder entry can be used to launch the first activity state.

C. System for Creation of Activity State and Triggering Reminder

Figure 5:
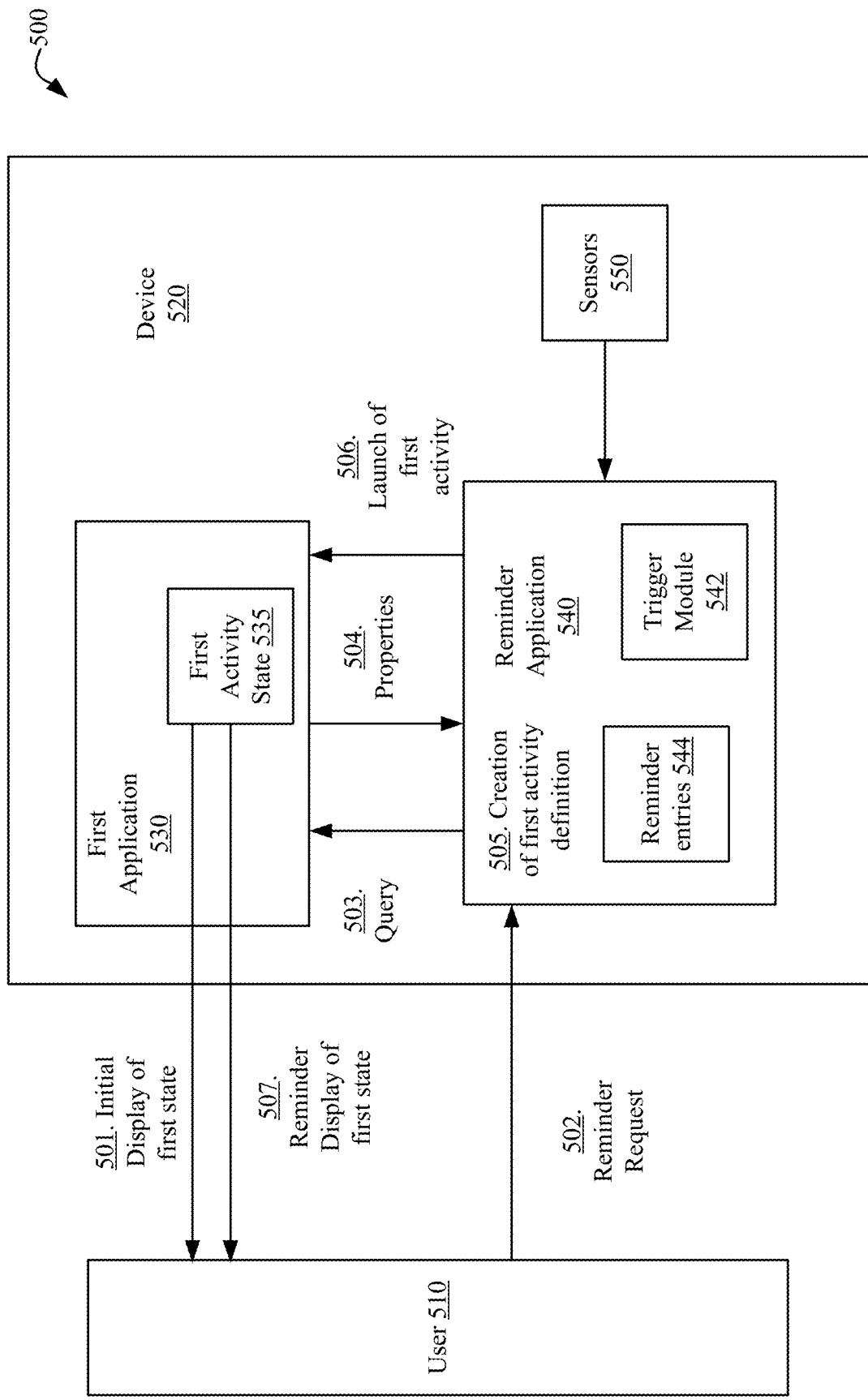
FIG. 5 shows a block diagram of a user interacting with a device to create a reminder using a current state of an executing application according to embodiments of the present invention.

FIG. 5 shows a block diagram 500 of a user 510 interacting with a device 520 to create a reminder using a current state of an executing application according to embodiments of the present invention. In FIG. 5, device 520 includes a first application 530 that has a first activity state 535. In some embodiments, first application 530 can provide first activity state 535 to user 510 in response to the user 510 interacting with first application 530. For example, a user might select a particular e-mail of an e-mail application. First application 530 would have many other activity states (not shown), e.g., for other e-mails opened and other actions for an e-mail, e.g., forward instead of reply.

A reminder application 540 can create reminders based on requests from user 510, store the reminders as reminder entries 544. Reminder application 540 can include a trigger module 542 for determining when the one or more trigger criteria are satisfied. As an example, sensors 550 can provide information (e.g., time, location, etc.) to trigger module 542 to determine when the one or more trigger criteria are satisfied. Trigger module 542 can send a command to launch first activity state 535 of first application 530 as part of providing the reminder to user 510.

At 501, first activity state 535 can be provided to user 510 before the creation of any reminder, e.g., to allow user 510 to specify first activity state 535 for the reminder. The initial display indicates that a later display can occur when the reminder is triggered. The initial display of the first activity state can include an object for the user to select to invoke a reminder application to create a reminder.

At 502, user 510 sends a reminder request to device 520. The reminder request can be sent while first activity state 535 is provided to user 510. For example, a user can select a share icon (e.g., 310 of FIG. 3) to provide the reminder request. First application 530 can be a currently executing application that is providing information to a display of the device. First activity state 535 can be the front-most activity being provided to a user.

At 503, reminder application 540 can send a query to first application 530 about the current state of the application. First application 530 can determine the current activity state as first activity state 535. First application 530 can determine one or more properties for first activity state 535. For example, any state variables that have been specified to result in first activity state 535 can be obtained. An application may be configured to track such state variables, or internally query certain routines to obtain such properties.

At 504, first application 530 can send the one or more properties to reminder application. Communications between first application 530 and reminder application 540 can occur via function calls that specify an application identifier and that are managed by system routines. For example, operating system routines can route the function calls appropriately.

At 505, reminder application 540 can create a first activity definition that corresponds to first activity state 535 and store the first activity definition in a first reminder entry in reminder entries 544 (e.g., in a table). The first activity definition can be formed from one or more properties of first activity state 535.

At 506, in response to the one or more trigger criteria being satisfied, reminder application 540 can send a launch command to first application 530 to launch first activity state 535. For example, trigger module 542 can determine that the one or more trigger criteria are satisfied. The first reminder entry can be retrieved, and the first activity definition can be used to send the launch command to first application 530.

At 507, first activity state 535 can be sent in a reminder display to user 510. Such a display can be a screen showing first activity state 535, potentially with a reminder note.

III. Voice Interface

In some embodiments, one or more of the request commands can be voice commands. For example, a user can provide a reminder command in the form of "remind me to . . . ." The user can further provide one or more trigger criteria by voice commands. For example, a user can say "at 3:00 PM tomorrow" or any other date/time, and/or a user can say "when I arrive home" or any other location.

Further, a user can verbally provide a specification of a first activity state of a first application to execute on the computing device as part of the reminder. The first application could be currently executing and providing a user interface on a display screen of the device, but not necessarily, e.g., the application may be running in the background or not running at all. If the first application was currently providing the first activity state, the voice command to provide a specification could be simpler, as the device already has information about the first activity state.

By using voice commands, embodiments can restrict the use of activity states only to reminders. This privacy restriction to reminders can be easier than embodiments using a touchscreen interface, particularly when the touchscreen interface is utilized for other types of sharing, besides reminders.

A. Foreground

An application is running in the foreground when the application is providing a user interface, e.g., by displaying a window to a user. When application is running in the foreground, the user might be able to use the semantic term "this" in a request command to refer to the current activity state. For example, the user can refer to a reminder for "this email," "this document," "this map view," and any other current activity state.

With the current activity state being identified, a user can also provide a particular action besides simply "remind me." Thus, a user could request for the current activity state to be provided when one or more trigger criteria are satisfied, but a user can also specify additional information to tailor the activity state specifically to how the activity state should be provided. For example, a user could specify "remind me to reply to this email," where "to reply" can further indicate that the activity state to be provided in a reminder is not just the particular email, but a reply window for replying to the particular email. Thus, a user can add additional properties to the current activity state (e.g., just viewing a particular e-mail) as part of providing the specification for the first activity state to be provided for the reminder.

As for how to provide the activity state, a user could say "remind me about this email and highlight the subject line." When the email is provided to the user, the subject line can be highlighted as requested.

A user can also specify a title and/or notes, where the notes may be provided in a notification when the reminder is triggered. For example, a user could say "remind me about this email as I need to discuss with George." The email can be displayed, thereby providing the proper context to the user, and a user could be provided a notification including the words "need discuss with George." Thus, the more data that is provided, the more the reminder application can configure the reminder for the user.

B. Background

An application does not need to be running in the foreground for a user to specify an activity state of the application. Instead, a user can identify a particular application via a voice command, and provide a specification of the activity state. In the foreground example, a user can specify a reply window for a particular e-mail that is open. In a similar manner, a user can provide sufficient description to identify the e-mail, such as "the e-mail from Susan Chase received yesterday on my work e-mail account." As another example, one could specify "a map view of San Francisco," potentially with a particular zoom setting, such as "a map view that just San Francisco." The map application can determine a zoom level that provides just the outer boundary of San Francisco.

In some implementations, a user can prompt a device to begin a voice command interface. The user can enter a reminder mode with keywords, e.g., with "remind me," "reminder," and the like. A voice command interface may require activation, e.g., by a certain pattern of pushing a button or a certain gesture of moving the device. The information about the application and any actions to get to the desired activity state can be stored for when the reminder is triggered, so as to launch the application as the desired activity state.

Another example of information for a specification of an activity state can include: find important e-mails (e.g., ones that are flagged), which can result in one reminder for many e-mails or multiple reminders for each of the important e-mails. The user can be prompted for further clarification, if needed, before creating the reminder. For example, if a user just provided a first name Dave, the device can ask which Dave is meant. If multiple e-mails or other communications satisfy the specification, then the device can request further information be provided for the specification.

C. System Where Properties Determined From Application

Figure 6:
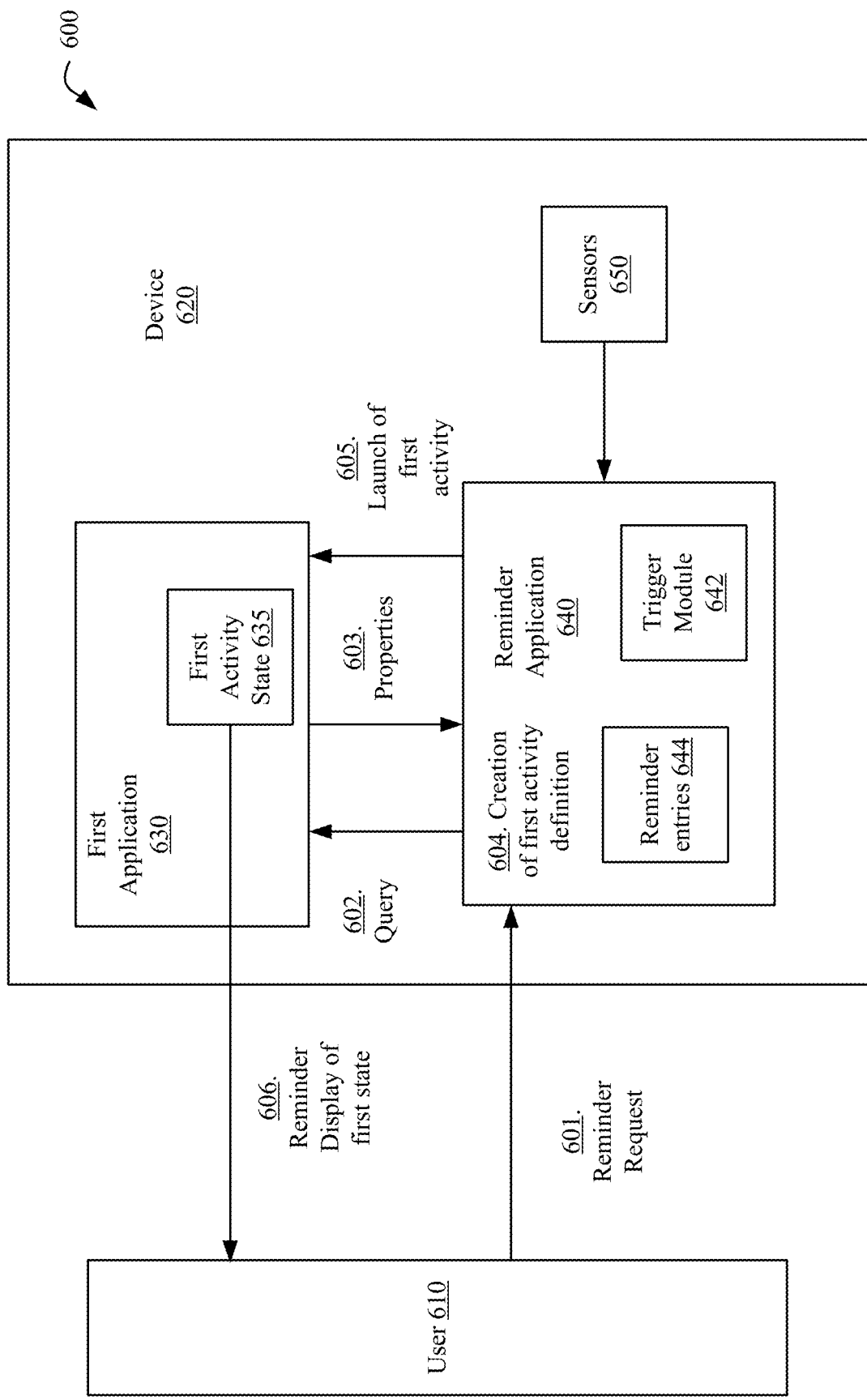
FIG. 6 shows a block diagram of a user interacting with a device to create a reminder using voice commands and properties from an application according to embodiments of the present invention.

FIG. 6 shows a block diagram 600 of a user 610 interacting with a device 620 to create a reminder using voice commands and properties from an application according to embodiments of the present invention. In FIG. 6, device 620 includes a first application 630 that has a first activity state 635. Aspects of other devices, e.g., of FIGS. 2 and 5 can be implemented for FIG. 6. Although described with respect to voice commands, aspects can be used for implementations not using voice commands.

A reminder application 640 can create reminders based on requests from user 610, store the reminders as reminder entries 644, and include a trigger module 642 for determining when the one or more trigger criteria are satisfied. As an example, sensors 650 can provide information (e.g., time, location, etc.) to trigger module 642 to determine when the one or more trigger criteria are satisfied. Trigger module 642 can send a command to launch first activity state 635 of first application 630 as part of providing the reminder to user 610.

At 601, user 610 sends a reminder request as a voice command to device 620. For example, user 610 can start a voice command mode, e.g., with a particular movement of device 620 or activation of a button on device 620. The user can then provide one or more keywords, such as "remind me" or "reminder." First application 630 could be a currently executing application that is providing information to a display of device 620 at a time of receiving reminder request 601, with first activity state 635 being the front-most activity. In other embodiments, the first application 630 may not be currently executing on device 620.

In some embodiments, the reminder request can include the specification corresponding to first activity state 635. For example, a user can specify actions the user would take in order to reach first activity state 635 with first application 630 executing in the foreground. Such user actions can be used to query first application 630 or to manipulate first application 630 to reach first activity state 635, where first application 630 could then be queried for its current activity state.

At 602, reminder application 640 can send a query to first application 630. Reminder application 640 can use the specification received from user 610 to formulate the query. The query may be needed when the specification does not contain the precise commands to launch first activity state 635 directly, although the specification can identify first activity state 635.

Such a query process can be used when the specific launch commands are desired for storing in reminder entries 644. In other embodiments, the specification from the user may include one or more properties for determining an activity definition for launching first activity state 635, or the one or more properties may be equivalent to the words of the request commands.

At 603, first application 630 can determine one or more properties corresponding to first activity state 635 and send the one or more properties to reminder application 640. As part of the query, a routine on device 620 can provide commands corresponding to the specification provided by the user, where the commands can update the state of first application 630. For example, the voice interface can simulate activation of buttons on a screen of first application 630 to reach first activity state 635. First application 630 can then determine a current activity state that results from the commands, which would correspond to first activity state 635.

At 604, reminder application 640 can create a first activity definition that corresponds to first activity state 635 and store first activity definition in a first reminder entry in reminder entries 644 (e.g., in a table). The definition is formed from one or more properties of first activity state 635.

At 605, in response to the one or more trigger criteria being satisfied, reminder application 640 can send a launch command to first application 630 to launch first activity state 635. For example, trigger module 642 can determine that the one or more trigger criteria are satisfied. The first reminder entry can be retrieved, and the first activity definition can be used to send the launch command to first application 630.

At 606, first activity state 635 can be sent in a reminder display to user 610. Such a display can be a screen showing first activity state 635, potentially with a reminder note.

D. System Where Properties Determined From Index

As mentioned above, the specification of an activity state by a user can be equivalent to the one or properties of an activity state and to an activity definition. But, the voice commands for specifying an activity state may differ from the one or more properties and the activity definition. A user may not typically speak in the same manner that the properties and definition need to be specified internally on a device. In such a situation, the specification may need to be translated. Such a translation can be performed at least partially by the application whose activity state is being determined. However, such a translation requirement of a client application can be burdensome on a developer. Accordingly, in some embodiments, a mapping index can be created that translates a specification to the one or properties for creating an activity definition.

The operating system of the device and/or a server in communication with the device can know all the possible activity states of each of the applications. For example, the developer can be required to provide architecture and/or API information before an application can be made available on a site from which an application can be installed. Accordingly, a plurality of applications at a store website can be indexed so that the translation (mapping) from voice commands to activity states can be determined so as to identify properties for creating the activity definition.

Figure 7:
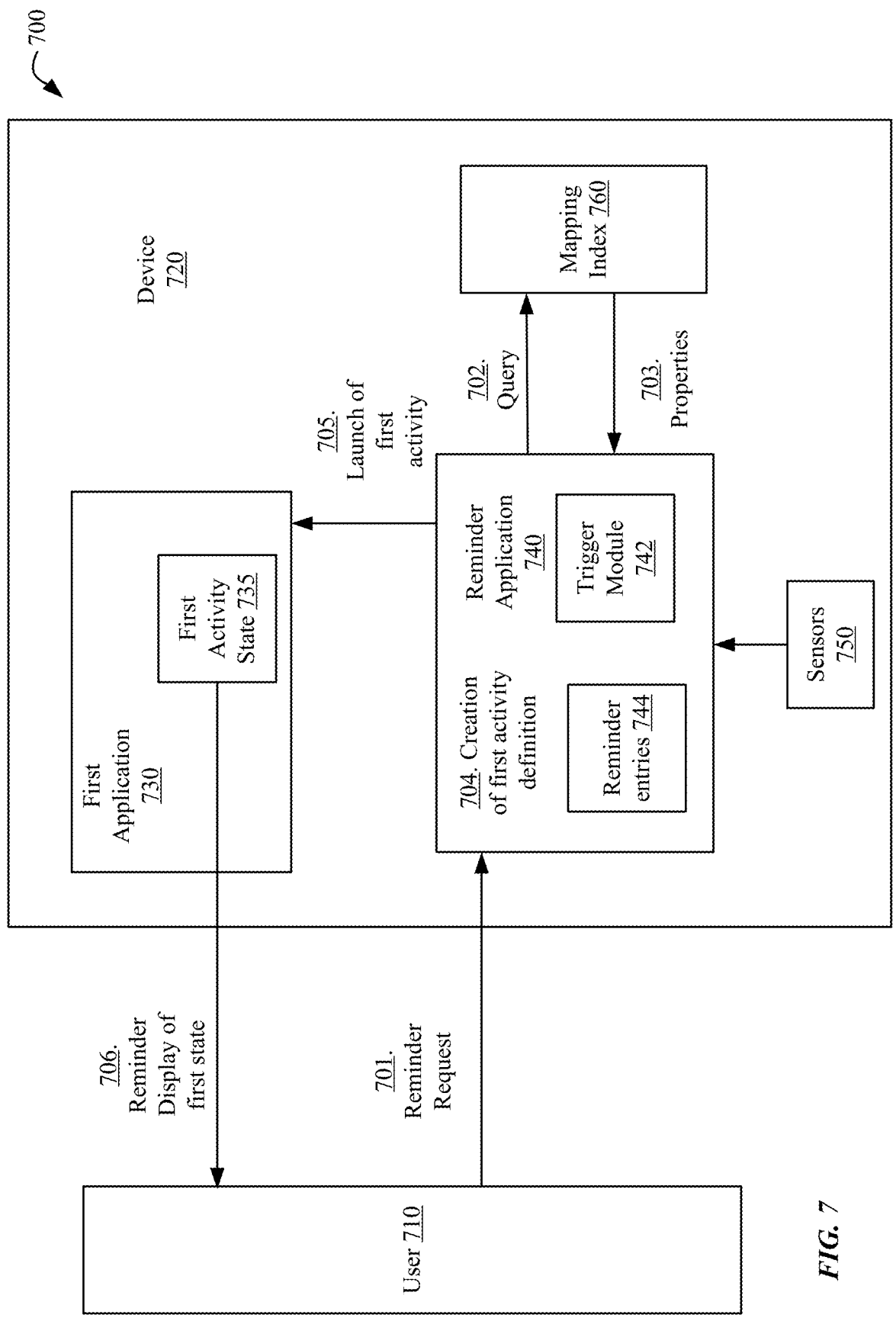
FIG. 7 shows a block diagram of a user interacting with a device to create a reminder using voice commands and properties from a mapping index according to embodiments of the present invention.

FIG. 7 shows a block diagram 700 of a user 710 interacting with a device 720 to create a reminder using voice commands and properties from a mapping index according to embodiments of the present invention. In FIG. 7, device 720 includes a first application 730 that has a first activity state 735. Aspects of other devices, e.g., of FIGS. 2, 5, and 6 can be implemented for FIG. 7. Although described with respect to voice commands, aspects can be used for implementations not using voice commands.

A reminder application 740 can create reminders based on requests from user 710, store the reminders as reminder entries 744, and include a trigger module 742 for determining when the one or more trigger criteria are satisfied. As an example, sensors 750 can provide information (e.g., time, location, etc.) to trigger module 742 to determine when the one or more trigger criteria are satisfied. Trigger module 742 can send a command to launch first activity state 735 of first application 730 as part of providing the reminder to user 710.

At 701, user 710 sends a reminder request as a voice command to device 720. The reminder request can include the specification corresponding to first activity state 735. As an example, the user can specify activity tags that correspond to first activity state 635, e.g., for use with a mapping index. Such a specification can be used to obtain one or more properties of a particular activity state for creating an activity state.

At 702, reminder application 740 can send a query to a mapping index 760. Reminder application 740 can use the specification received from user 710 to formulate the query. For example, activity tags in the user specification can be used to generate the query. The query may be needed when the specification does not contain the precise commands to launch first activity state 735 directly, although the specification can identify first activity state 735. Such a query process can be used when the specific launch commands are desired for storing in reminder entries 644.

At 703, mapping index 760 can map the specification (e.g., certain keywords/"activity tags" in the voice commands) to one or more properties corresponding to first activity state 735 and send the one or more properties to reminder application 740. Mapping index 760 could be on device 720 or on a server in communication with device 720. Mapping index 760 can be generated by a server computer connected with a site that includes applications for installing on devices.

Mapping index 760 can be implemented in a variety of ways, and multiple techniques may be available to one device and be dependent, e.g., on the way the specification is formulated. If the specification provide certain activity tags in a form that can be mapped directly to one or more properties of the activity state, then a lookup in a table can be made with the activity states. For example, each activity tag could be used separately to determine a particular property or subset of the properties. In another embodiment, the activity tags can map to an entire activity state, and the activity state can then be mapped to a set of one or more properties. For example, an activity record can include the one or more properties as fields. Thus, such a mapping would collectively use the activity tags. Sometimes a single voice command could correspond to multiple properties of an activity state.

At 704, reminder application 740 can create a first activity definition that corresponds to first activity state 735 and store first activity definition in a first reminder entry in reminder entries 744 (e.g., in a table). The definition can be formed from one or more properties of first activity state 735.

At 705, in response to the one or more trigger criteria being satisfied, reminder application 740 can send a launch command to first application 730 to launch first activity state 735. For example, trigger module 742 can determine that the one or more trigger criteria are satisfied. The first reminder entry can be retrieved, and the first activity definition can be used to send the launch command to first application 730.

At 706, first activity state 735 can be sent in a reminder display to user 710. Such a display can be a screen showing first activity state 735, potentially with a reminder note.

IV. Activity State of an Application

An application can have any number of activity states. The number of activity states available for launching can depend how many states the developer of the application has allowed access. Below are some examples of implementations using activity states. Further details about activity states can be found in U.S. Provisional Patent Application 62/005,781, entitled "Activity Continuation Between Electronic Devices," filed May 30, 2014; U.S. patent application Ser. No. 14/586,566, entitled "Activity Continuation Between Electronic Devices," filed Dec. 30, 2014; and U.S. patent application Ser. No. 14/691,440, entitled "Activity Continuation Between Electronic Devices," filed Apr. 20, 2015, the disclosures of which are incorporated by reference in their entirety.

A. Definition and Use of Activity State

An activity state can be defined as a stand-alone collective unit of information that can be used by an application to provide a particular screen to which a user would otherwise have to navigate. An activity state definition can be provided without any dependencies on any other information, and thus an application (on a same or different device) can use the activity state definition to provide the particular navigation screen without needing to obtain other information.

An activity state class can represent an instance of a user activity. The activity state class can encapsulate the state of the application in a way that can be continued in the application at a later date as part of a reminder or on other devices, which may use a related application, e.g., a browser for accessing a related website.

To create an activity state, the originating application can create an activity state object and call a function to send the activity state object to a reminder application for storing in a reminder entry. An activity state object can include a title and state information, e.g., information that a user has selected or entered to reach a particular activity state. The state information can be used to pass native data types or custom objects to the receiving device. Examples of native data types are Array, Data, Date, Dictionary, Null, Number, Set, String, unique user ID (UUID), and URL.

Once an instance of an activity state object becomes current within an application, the operating system or reminder application can periodically invoke an update routine to give a chance to update the activity state. The original application itself can update activity state objects, e.g., as a user is interfacing with the application, so that an activity state is available when a reminder is requested. For example, state information can be added by a function that takes arguments and update the state information of the specified application. Another function can be used to delete state information, or a combined function can add and delete.

When the application launches upon activation of the reminder, an application delegate can call a continue function and then obtain the activity state, e.g., as part of a command received from the reminder application. The continue function can then retrieve the activity state to re-create the particular activity state that the user wanted to include in the reminder. In another embodiment, the continue function can be called with an argument of the activity state, e.g., when the activity state has already been received from the reminder application. The user can then immediately finish a task associated with the reminder.

B. Activity Type

In some embodiments, when an activity state is created, an activity type for the activity can be specified. An activity type can be a unique string, e.g., in reverse DNS notation. Each application that is capable of receiving an activity state can declare the activity types that it will accept, e.g., like declaring the URL schemes the application supports. In some embodiments, for non-document based applications, activity types can be listed under an activity types key at the top level of an information property list.

For an application to support a given activity, there can be various requirements. For example, the application can have an activity type entry for the activity type. The application can also be required to have a developer certificate. If a reminder is to be viewed on another device, both applications can be required to originate from the same developer with the same developer team ID.

C. Receiving the Activities

When the application is launched as part of a reminder, an application delegate can perform at least some of the processing of the incoming activity state. Assuming that activity state definition is properly formed and retrieved, the operating system can call a continue function for the application. The activity state instance can be analyzed at this point.

The activity state can be passed to a root view controller of the application's window and return true, which can tell the operating system (OS) that the activity state has been handled successfully. From this point on, the application can forward calls and restore the activity. To call on the root view controller, a restore activity state function can be invoked. The OS can use this method to tell a receiver to restore an instance of the activity state.

In some embodiments, to reach the desired activity state, the application can move down a view controller hierarchy and pass the activity from the parent to child view controllers until the process reaches the point where the activity is consumed (e.g., all of the activity state information has been used).

D. Use in Reminder

When the one or more trigger criteria are satisfied and once a reminder application retrieves the activity definition, the OS can launch the corresponding application (i.e., corresponding to the activity definition). Once the application is launched, the OS can call on a continue application function. At this point the application may not have received the activity state instance. The OS can transfer data from the reminder application to the original application (which could be on another device if the reminder acts on multiple devices); such data can include any notes or information that might be displayed within the application.

It is possible that a new version of the application has been installed in between the creation of the reminder and a trigger of the reminder. In some implementations, a version number can be added to each reminder entry, and activity state definitions may only be accepted with a same version number (or potentially earlier).

Some embodiments can avoid using platform specific values like a content offset of a scroll view, as it can be better to use relative landmarks. For example, if the user is viewing some items in a table view, an application can pass the index path of the top most visible item in the table view in the activity state object instead of passing the content offset or visible part of the table view.

E. URLs

In some embodiments, a URL can be used in a definition for an activity state. This may be useful when the reminder is viewed on a different device that was used to initially create the reminder, where the other device may not have the application installed. Instead, the reminder can provide a URL as the activity state definition. The other device can recognize a URL in the activity state definition and use the URL in a browser to go to a designated Web page.

In some embodiments, the reminder entry can include both a URL and an application-specific activity state (both of which are activity state definitions). The other device can use an application ID to determine that a suitable application is not installed, and then use the URL instead in combination with launching a browser. For example, a review application can also be accessed on a website to see a particular business and corresponding reviews, e.g., if the review application is not installed.

Some applications could provide only URLs, and thus a reminder for such an application can always launch a browser when the one or more trigger criteria is satisfied. The application can identify information about a current state and then determine corresponding tags for a URL to result in a same or similar location on a website corresponding to the view in the application.

If the application is a browser, then an application-specific activity state could be a URL. The reminder entry can include a title of the Web page. The domain name can be put in the notes, so that the user can see what the reminder is about, since a URL may not be easily recognizable. Further state information can include any text added by a user and where on the website the user was at, e.g., including a scroll location. Thus, when a user looks at a list of reminders, the title and a clean domain can be seen such that a user would not be confused by a long URL.

Using a URL can add certain privacy protection, as then an application does not obtain information about user interactions with the application. Thus, on activation of a share sheet from a particular activity state of an application, the application does not obtain a full application-specific activity state but only a URL. Other applications might not have an associated website and thus a URL might not be appropriate, and an activity state might be allowed.

URLs could include documents on a network, e.g., on the Internet. Some embodiments can be limited to certain types of URLs, e.g., ones that use HTTP or HTTPS. In some implementations, file links can be passed as a relative path and re-constructed to obtain a URL.

V. Launching Activity State in Response to Trigger

A reminder can be created with a particular icon (e.g., a share icon) when the application is in the desired activity state. The title can be created from user input or information obtained from the particular activity state (e.g., a particular email that is part of the activity state). In an email example where the trigger is when the user gets home, the mail application can open. As another example, a notification can be provided that provides a user an option to launch the application in a particular activity state. In various embodiments, the notification can include the title of the reminder and any notes.

Other examples of triggers can be the use of a particular application. For example, when a particular application is opened, it might trigger a particular document to open in that application, and potentially open to a particular part of that document. For example, a user might open a presentation application, triggering a particular presentation to be opened. Further, notes provided by the user for a particular change might be provided at that time. Such a reminder might be created by voice commands when the user is not editing the presentation document. Thus, the reminder can be presented to the user at an opportune time, as opposed to sitting in a separate notes file.

As another example, a reminder can be created for an application to check for information that is not available yet. For example, a reminder might automatically bring up a sports application for checking scores of a particular game that is to occur tomorrow. A particular activity state for checking such scores can be known, e.g., from the user checking scores of previous games.

In some embodiments, an activity state might not be reachable at the time the reminder is triggered. For example, the activity state might be for current news stories, current posts, etc. Accordingly, a user may not be able to reach a particular story in response to a reminder request to read a particular story/post. In some implementations, the activity of a particular story/post might be saved directly to the story/post, thereby preserving the ability to read the story/post.

Besides or in addition to a notification (e.g., asking the user whether to launch the activity state of the reminder), a reminder can have other types of alerts. For example, an audio alert can also be provided.

VI. Example Activity States

Activity states can vary as much as different applications vary. For example, different applications can have different number of properties for defining an activity state. For activity states that involve a particular document (e.g., email or file), an activity state can include the selection of text within the document. Further, the selected text can be provided in the notes of the reminder.

For a map application, an activity state can include any features (properties) that are used to reach the particular map view. For example, an activity state can include a location of the center of the view, a zoom level, and an orientation (e.g., which direction is up on the screen). Further properties could be any search terms entered by a user and any pins a user has dropped or have resulted from a search.

Applications can determine the level of granularity to provide in an activity state. For example, an application might only have a few levels in a hierarchical tree that specifies all the properties of activity states, whereas another application might have five or more levels. Further, applications may or may not allow additional user information that shows up on a screen to be classified as a property of the activity state. Thus, it can be up to an application to determine how to capture the activity state. Regardless, embodiments can determine the properties, even with a mapping index, as long as the properties are published by the developer of the application.

VII. Handoff

A user may have multiple devices and these devices can interact with each other. Therefore, an exemplary embodiment can create a reminder to be shared between different devices. Specifically, a reminder can be created at a first device, such as a mobile phone, and the reminder can be triggered when the user operates another device, such as their laptop or a second mobile phone.

As an example, a user can be reviewing e-mails on a mobile device. However, the user would like to reply to an e-mail at a later time from their laptop. The user can create a reminder on the mobile device (e.g., using techniques described herein). Once created, the reminder can be sent to the laptop. A reminder application on the laptop can then determine whether the one or more trigger criteria are satisfied.

For example, the user can create a reminder to "Reply to e-mail when I am on my laptop." When the user operates the laptop, the reminder can be triggered, and the user can be reminded to reply to the email. Operation of the laptop can be determined based on, for example, a determination that the laptop has been connected to a network or a cloud, and the reminder can be subsequently triggered. A mobile phone and laptop are described above, however, various devices can be used to communicate a reminder.

Such reminder can also be sent to another person. Such reminders would not work if the activity state involved a particular document on the sender's device. But, a more general reminder could equally launch on the other person's device, as long as the other person's device has a corresponding application. In the process, a device could also have a reminder application that recognizes the URL and launches a network browsing application, e.g., if the other application was not installed on the other person's device and the activity definition included a URL.

VIII. Example Device

Figure 8:
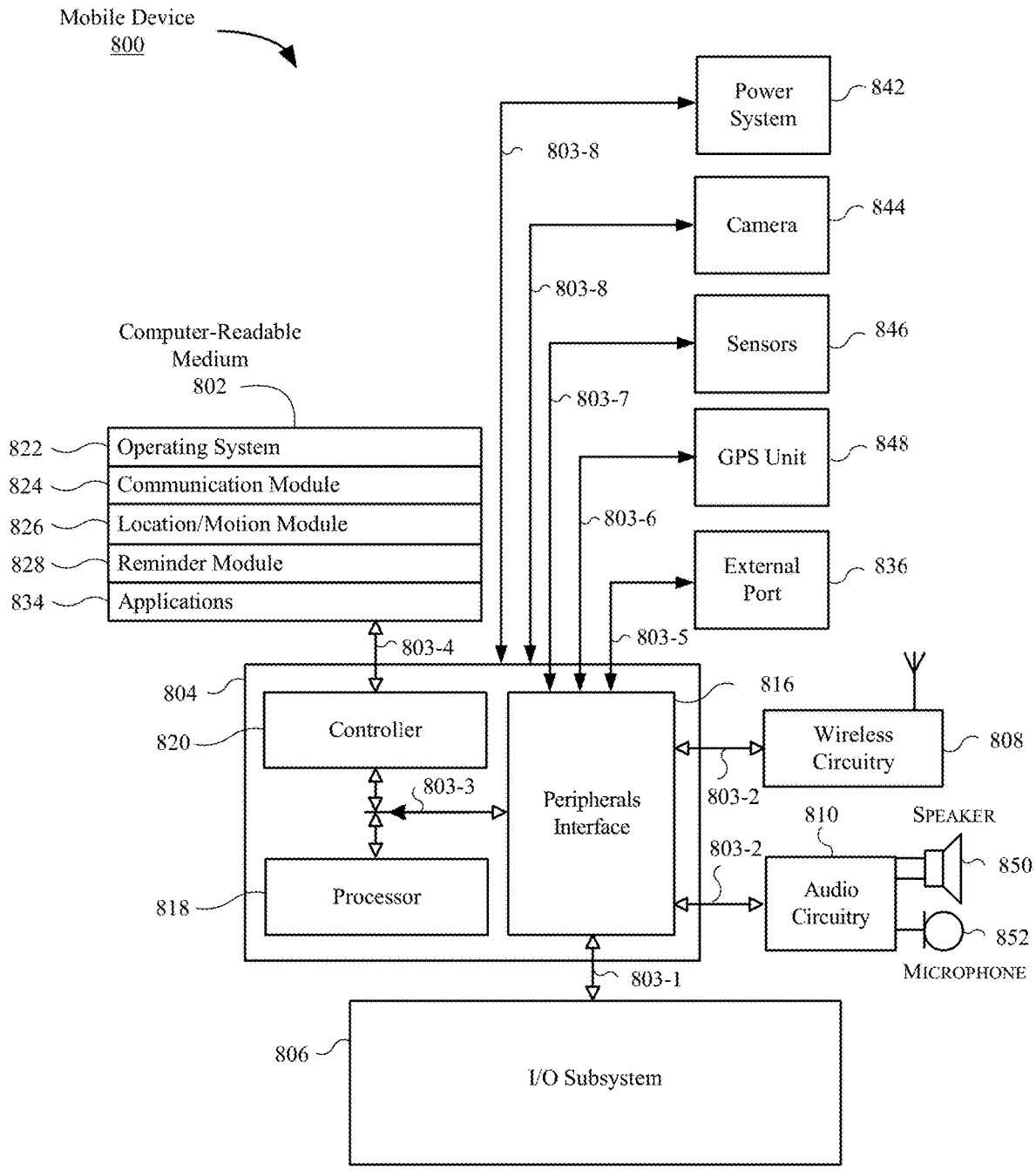
FIG. 8 is a block diagram of an example device.

FIG. 8 is a block diagram of an example device 800, which may be a mobile device. Device 800 generally includes computer-readable medium 802, a processing system 804, an Input/Output (I/O) subsystem 806, wireless circuitry 808, and audio circuitry 810 including speaker 850 and microphone 852. These components may be coupled by one or more communication buses or signal lines 803. Device 800 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a car display unit, or the like, including a combination of two or more of these items.

It should be apparent that the architecture shown in FIG. 8 is only one example of an architecture for device 800, and that device 800 can have more or fewer components than shown, or a different configuration of components. The various components shown in FIG. 8 can be implemented in hardware, software, or a combination of both hardware and software, including one or more signal processing and/or application specific integrated circuits.

Wireless circuitry 808 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 808 can use various protocols, e.g., as described herein.

Wireless circuitry 808 is coupled to processing system 804 via peripherals interface 816. Interface 816 can include conventional components for establishing and maintaining communication between peripherals and processing system 804. Voice and data information received by wireless circuitry 808 (e.g., in speech recognition or voice command applications) is sent to one or more processors 818 via peripherals interface 816. One or more processors 818 are configurable to process various data formats for one or more application programs 834 stored on medium 802.

Peripherals interface 816 couple the input and output peripherals of the device to processor 818 and computer-readable medium 802. One or more processors 818 communicate with computer-readable medium 802 via a controller 820. Computer-readable medium 802 can be any device or medium that can store code and/or data for use by one or more processors 818. Medium 802 can include a memory hierarchy, including cache, main memory and secondary memory.

Device 800 also includes a power system 842 for powering the various hardware components. Power system 842 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 800 includes a camera 844. In some embodiments, device 800 includes sensors 846. Sensors can include accelerometers, compass, gyrometer, pressure sensors, audio sensors, light sensors, barometers, and the like. Sensors 846 can be used to sense location aspects, such as auditory or light signatures of a location.

In some embodiments, device 800 can include a GPS receiver, sometimes referred to as a GPS unit 848. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 818 run various software components stored in medium 802 to perform various functions for device 800. In some embodiments, the software components include an operating system 822, a communication module (or set of instructions) 824, a location module (or set of instructions) 826, a reminder module 828 (e.g., corresponding to reminder applications described herein), and other applications (or set of instructions) 834.

Operating system 822 can be any suitable operating system, including iOS, Mac OS, Darwin, RTXC, LINUX, UNIX, OS X, WINDOWS, or an embedded operating system such as VxWorks. The operating system can include various procedures, a plurality of instructions, software components and/or drivers for controlling and managing general system tasks (e.g., memory management, storage device control, power management, etc.) and facilitates communication between various hardware and software components.

Communication module 824 facilitates communication with other devices over one or more external ports 836 or via wireless circuitry 808 and includes various software components for handling data received from wireless circuitry 808 and/or external port 836. External port 836 (e.g., USB, FireWire, Lightning connector, 60-pin connector, etc.) is adapted for coupling directly to other devices or indirectly over a network (e.g., the Internet, wireless LAN, etc.).

Location/motion module 826 can assist in determining the current position (e.g., coordinates or other geographic location identifier) and motion of device 800. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 826 receives data from GPS unit 848 and analyzes the signals to determine the current position of the mobile device. In some embodiments, location/motion module 826 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 808 and is passed to location/motion module 826. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 800 based on the position coordinates of the corresponding transmitters. Regardless of the specific location technology used, location/motion module 826 receives information from which a location fix can be derived, interprets that information, and returns location information, such as geographic coordinates, latitude/longitude, or other location fix data.

Application suggestion module 828 can include various sub-modules or systems, e.g., as described above in FIG. 7. Application suggestion module 828 can perform all or part of method 400.

The one or more applications 834 on the mobile device can include any applications installed on the device 800, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 806 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 806 can include a display and user input devices such as a keyboard, mouse, and/or track pad. In some embodiments, I/O subsystem 806 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 800 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a plurality of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Although the invention has been described with respect to specific embodiments, it will be appreciated that the invention is intended to cover all modifications and equivalents within the scope of the following claims.

What is claimed is:

1. A method for an application, on a computer device, to provide a map to a selected view based on trigger criteria, the method comprising, at the computer device:
receiving a first request to create a reminder;
after receiving the first request to create the reminder, receiving request commands from a user to create a reminder entry for the reminder, the request commands including:
a reminder command for invoking the application to execute on the computer device;
one or more trigger criteria for providing the selected view to the user; and
a plurality of map properties input by the user to obtain the selected view of the map, and
wherein triggering the providing the selected view causes the application to use a first portion of a sequence of the plurality of map properties to change a state of the application to an intermediate application state and causes the application to use a second portion of the sequence of the plurality of map properties to change the state of the application to the selected view;
in response to receiving the request commands to create the reminder entry, generating the reminder entry;
detecting that the one or more trigger criteria are satisfied; and
responsive to detecting that the one or more trigger criteria are satisfied, opening the application to the selected view via the sequence of map properties within the application.

2. The method according to claim 1, wherein the request commands to create the reminder entry is sent in a share object.

3. The method according to claim 1, wherein the request commands to create the reminder entry is received via a voice command.

4. The method according to claim 1, wherein the request commands to create the reminder entry is received via a touch screen.

5. The method according to claim 1, wherein the first request to create the reminder entry is generated on the application that is running in a foreground of the computer device at a time the reminder is generated.

6. The method according to claim 1, wherein the first request to create the reminder is generated for the application that is running in a background of the computer device at a time the reminder is generated.

7. The method according to claim 1, wherein before opening the application to the selected view within the application, launching the application.

8. The method according to claim 7, wherein the launching the application and opening the application to the selected view within the application is performed without user intervention.

9. The method according to claim 1, wherein the invoked application corresponds to a website.

10. The method according to claim 1, further comprising:
receiving a second request from the user to create a second reminder;
after receiving the second request to create the second reminder, receiving request commands from the user to create a second reminder entry, the request commands including:
a reminder command for invoking a second application, that is different from the application providing the map, to execute on the computer device;
one or more trigger criteria for providing the second reminder to the user; and
a plurality of properties input by the user to obtain a selected view, wherein triggering the reminder causes the second application to use the plurality of properties in order to launch to the selected view within the second application.

11. A computer product comprising a non-transitory computer readable medium storing instructions that when executed control an application, on a computer device, to provide a map to a selected view based on trigger criteria, the instructions comprising:
receiving a first request to create a reminder;
after receiving the first request to create the reminder, receiving request commands from a user to create a reminder entry for the reminder, the request commands including:
a reminder command for invoking the application to execute on the computer device;
one or more trigger criteria for providing the selected view to the user; and
a plurality of map properties input by the user to obtain the selected view of the map, and
wherein triggering the providing the selected view causes the application to use a first portion of a sequence of the plurality of map properties to change a state of the application to an intermediate application state and causes the application to use a second portion of the sequence of the plurality of map properties to change the state of the application to the selected view;
in response to receiving the request commands to create the reminder entry, generating the reminder entry;
detecting that the one or more trigger criteria are satisfied; and responsive to detecting that the one or more trigger criteria are satisfied, opening the application to the selected view via the sequence of map properties within the application.

12. The computer product according to claim 11, wherein the request commands to create the reminder entry is sent in a share object.

13. The computer product according to claim 11, wherein the request commands to create the reminder entry is received via a voice command.

14. The computer product according to claim 11, wherein before opening the application to the selected view within the application, launching the application.

15. The computer product according to claim 14, wherein the launching the application and opening the application to the selected view within the application is performed without user intervention.

16. A computer device including an application configured to provide a map to a selected view based on trigger criteria, the computer device comprising:
   a memory for storing reminders;
   one or more sensors;
   one or more processors configured to:
      receiving a first request to create a reminder;
      after receiving the first request to create the reminder, receive request commands from a user to create a reminder entry for the reminder, the request commands including:
         a reminder command for invoking the application to execute on the computer device;
         one or more trigger criteria for providing the selected view to the user; and
         a plurality of map properties input by the user to obtain the selected view of the map, and
      wherein triggering the providing the selected view causes the application to use a first portion of a sequence of the plurality of map properties to change a state of the application to an intermediate application state and causes the application to use a second portion of the sequence of the plurality of map properties to change the state of the application to the selected view;
   in response to receiving the request commands to create the reminder entry, generate the reminder entry;
      detect that the one or more trigger criteria are satisfied; and
      responsive to detecting that the one or more trigger criteria are satisfied, open the application to the selected view via the sequence of map properties within the application.

17. The computer device according to claim 16, wherein the request commands to create the reminder entry is sent in a share object.

18. The computer device according to claim 16, wherein the request commands to create the reminder entry is received via a voice command.

19. The computer device according to claim 16, wherein before opening the application to the selected view within the application, launching the application.

20. The computer device according to claim 19, wherein the launching the application and opening the application to the selected view within the application is performed without user intervention.

* * * * *